United States Patent Office 2,965,624
Patented Dec. 20, 1960

2,965,624

CARBON-ALKALI METAL COMPOUNDS AS POLYMERIZATION CATALYST

Herbert R. Anderson, Jr., Bartlesville, Okla., assignor to Phillips Petroleum Company, a corporation of Delaware No Drawing. Filed Nov. 21, 1957, Ser. No. 697,781

15 Claims. (Cl. 260—94.2)

This invention relates to synthetic rubbers. In particular, this invention relates to a novel catalytic polymerization of conjugated dienes.

Various methods are described in the literature for polymerizing conjugated dienes, particularly 1,3-butadiene, including emulsion polymerization, alkali metal-catalyzed polymerization, and alfin-catalyzed polymerization. Emulsion polymerization of 1,3-butadiene gives a polymer with from about 60 to about 80 percent trans 1,4-addition, from about 5 to about 20 percent cis 1,4-addition, and from about 15 to about 20 percent 1,2-addition. Sodium-catalyzed polybutadiene has from about 60 to about 75 percent 1,2-addition, the remainder being cis and trans 1,4-addition. Alfin-catalyzed polybutadiene has from about 65 to 75 percent trans 1,4-addition, from about 5 to about 10 percent cis 1,4-addition, and from about 20 to about 25 percent 1,2-addition. For a more complete discussion of the configuration of polybutadiene, reference is made to an article by J. L. Binder appearing in Industrial and Engineering Chemistry No. 46, 1727 (August 1954).

These various addition products are termed synthetic rubber. These rubbers have many uses, such as in tire carcasses, tread stock, inner tubes, various molded articles such as rubber gloves, toys, etc, rubber pipe and tubing and the like. These rubbers have various properties depending upon the monomers employed, the polymeric configuration and the polymerization conditions. For example, polymers of cis 1,4-addition generally more closely resemble natural rubber than do the trans 1,4-addition products or the 3,4- or 1,2-addition products. The 1,2- and 3,4-addition products have residual unsaturation in side chains and therefore are subject to further polymerization to form so-called graft polymers.

It is an object of this invention to provide a novel catalyst system for polymerizing conjugated dienes.

It is another object of this invention to provide a novel polymerization system for preparing polymers of isoprene having a high percentage of 3,4-addition.

Other objects, features and advantages of this invention will be obvious to those skilled in the art having been given this disclosure.

According to this invention a conjugated diene is contacted under polymerization conditions with a reaction compound of carbon with an alkali metal selected from the group consisting of sodium, potassium, rubidium, and cesium to form a polymer of said conjugated diene. The carbon-alkali metal compound can be employed alone or in conjunction with a group IV metal compound, particularly the halides and various oxygenated derivatives such as alkoxides of said group IV metals.

The carbon-alkali metal compounds employed as additives are pyrophoric and air must be excluded during their preparation and storage. One method which can be employed for the preparation of these compounds, sometimes referred to as alloys, involves reaction of vaporized alkali metal with the carbon under conditions suitable to effect the reaction. In this method a reactor system, frequently constructed of glass, is provided which contains separate compartments for charging the carbon and alkali metal, separate heating means for each compartment, and a means for evacuating the system while heating the carbon. After heating the carbon and evacuating the system to remove all volatile materials, the reactor is sealed and placed in a vertical position with the compartment containing carbon below that containing the alkali metal. Upon heating the upper compartment under suitable conditions, the alkali metal is melted and transferred to the lower chamber with the carbon. The chamber is sealed and the reactants heated to effect reaction between the carbon and alkali metal.

Heating of the carbon while the system is being evacuated is generally effected at a temperature in the range between 100 and 600 C. if a glass vessel is used. Higher temperatures can be used with other types of vessels. The time of heating and evacuation will depend upon the temperature. It will generally be in the range between one and 40 hours. Obviously the higher the temperature employed, the shorter the time required for the degassing operation.

The step which involves transfer of the alkali metal to the compartment containing carbon is generally operated at a temperature in the range between 100 and 500° C. The time required for transfer of the alkali metal will depend upon the temperature and will generally be in the range between 10 minutes and 100 hours, preferably between 10 and 50 hours. Temperatures in excess of 200° C. are preferred in this step in order to build up a high vapor pressure of alkali metal and aid its transfer to the compartment containing carbon.

The reaction between the alkali metal and carbon is effected at a temperature generally in the range between 375 and 500° C. and will depend upon the stability of the product.

Carbon which is applicable for the production of the carbon-alkali metal compounds includes graphite and other forms of carbon which have, at least to some extent, a graphitic or lamellar structure, such as channel black, furnace black, soot, etc. In the graphite crystal lattice, the carbon atoms are arranged in flat layers, each having a honeycomb-like structure. These layers are stacked parallel to each other in such a way that half the atoms in one layer lie normally above half the atoms in the layer beneath, while the other half are normally above the centers of the hexagons of the layer below. Alternate layers lie, atom for atom, normally above each other.

If a piece of carbon, e.g., graphite, is placed in contact with molten potassium in an evacuated tube, a swelling occurs and the potassium atoms, or ions, penetrate the hexagon layer-planes of the graphite crystal lattice and increase their spacing. The new lattice in a compound such as $C_8K$ consists of alternate carbon and potassium layer-planes. It is a bronze colored product. The compound, $C_{16}K$, is a steel blue material. It has a layer of potassium atoms only in every second inter-layer-plane space of the graphite lattice.

The carbon-alkali metal compounds employed in this invention are generally those which contain mole ratios of carbon to alkali metal of 8–32:1 although amounts outside this range are sometimes used. The product formed will depend upon the amounts of carbon and alkali metal charged. Alkali metals employed are sodium, potassium, rubidium, and cesium. The reactions take place in the manner described for potassium and carbon, and the products are pyrophoric. They must, therefore, be protected from the air during storage and use.

When the carbon-alkali metal compounds are to be used as polymerization catalysts, one convenient method for protecting them from the air is to coat them with an inert, relatively low melting material such as petrolatum.

As hereinbefore stated, the carbon-alkali metal compounds can be employed alone as polymerization catalysts or in conjunction with group IV metal compounds, i.e., compounds of titanium, silicon, thorium, zirconium, tin, lead, hafnium, germanium, and cerium. Compounds of these metals which are applicable can be represented by the formula $X_nM(OR)_m$, wherein X is a halogen, M is a group IV metal, R is a member selected from the group consisting of alkyl, aryl, cycloalkyl, alkaryl, aralkyl, alkenyl, cycloalkenyl, and acyl radicals, $m$ and $n$ are integers from 0 to 4 inclusive, and $m+n$ equals the valence of the metal, i.e., 2, 3, or 4.

Each R contains not more than 20 carbon atoms, preferably less than 10 carbon atoms, with the total carbon atoms in the complex compound not exceeding 50. Examples of these compounds include the di-, tri-, and tetrahalides of the group IV metals and oxygenated compounds such as tetra-n-butyl titanate, tetraisopropyl titanate, tetra-m-tolyl titanate, tetraallyl titanate, tetracyclohexenyl titanate, tetraethyl zirconate, tetraamyl zirconate, tetramethyl hafnate, titanium acetate, zirconium butoxide, zirconium propionate, thorium benzoate, and the like. Mixtures of two or more of the aforementioned materials can be used in the catalyst compositions of this invention. Of particular interest are the halides, chlorides, bromides, ioclids and fluorides of the group IV metals, especially the tetrahalides such as titanium tetrachloride, zirconium tetrabromide, thorium tetraiodide, tin tetrafluoride and the like.

When group IV metal compounds are employed in catalyst compositions with carbon-alkali metal compounds, the amount used will generally be in the range between 0 and 10 moles per mole of the carbon-alkali metal metal compound.

The amount of total catalyst composition used in polymerization reactions can vary over a wide range depending upon several factors including the particular catalyst system employed, the monomeric material, the polymerization temperature, etc. The amount of total catalyst composition will usually be in the range between 0.01 and 15.0 weight percent, based on the amount of monomeric material charged to the polymerization reactor.

Conjugated dienes polymerized in accordance with the process of this invention include those compounds which contain from 4 to 12, inclusive, carbon atoms per molecule. These conjugated dienes can have non interfering substituents such as alkoxy groups, etc. Examples of conjugated dienes which can be used include 1,3-butadiene, 2-methyl-1,3-butadiene (isoprene), 2,3-dimethyl-1,3-butadiene, 2-methoxy-1,3-butadiene, 2-ethoxy-3-ethyl-1,3-hexadienes, 2-methyl-1,3-pentadiene, 1,3-pentadiene (piperylene), 2,3-dimethyl-1,3-pentadiene, 2-methyl-3-ethyl-1,3-pentadiene, 2-phenyl-1,3-butadiene, 2,3-diethyl-1,3-octadiene, and the like.

This invention is applicable to the polymerization of the above-identified conjugated dienes either alone or in admixture with each other and/or with minor amounts of one or more other compounds containing an active $CH_2=C<$ group which are copolymerizable therewith. Preferably the conjugated diene will comprise at least 70 weight percent of the total monomers charged since such compositions are rubbery in nature.

Representative monomers copolymerizable with the conjugated diene include aryl olefins such as styrenes, various alkyl styrenes, p-chlorostyrene, p-methoxystyrene, alpha-methylstyrene, vinylnaphthalene and similar derivatives thereof and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinyl ethinyl alkyl carbinols, vinyl acetate, vinylcarbizole, vinylacetylene; vinyl substituted heterocyclic compounds such as 2-vinylpyridine, 2-methyl-6-vinylpyridine, 2-methyl-5-vinylpyridine, 2-vinyl-5-ethylpyridine, 2-vinylquinoline, and the like and other unsaturated hydrocarbons, esters, alcohols, acids, ethers, heterocyclics, etc. of the type described. The art is familiar with such copolymerizable monomers.

It is preferred that the present process be operated in the presence of diluents. Materials suitable for this purpose are hydrocarbons which are not detrimental to the polymerization reaction and which are liquid under conditions of the process. Suitable diluents include propane, n-butane, isopentane, n-hexane, isohexane, n-heptane, 2,2,4-trimethylpentane, n-decane, cyclohexane, methylcyclohexane, benzene, toluene, xylene, ethylbenzene, and mixtures thereof. In general, the total carbon atoms per molecule in each diluent will not exceed about 10.

Polymerization temperature is generally in the range between —20 and 150° C., preferably between —5 and 80° C.

Products prepared using the catalyst of this invention range from rubbery to resinous, depending upon the catalyst systems, monomers, reaction conditions, and the like.

When the conjugated diene is isoprene, I have found that the product contains a high percentage of 3,4-addition polymer. For this reason, I will illustrate my invention utilizing isoprene as the monomer, however, it should be understood, that the disclosed catalyst is useful in polymerizing conjugated dienes alone or with comonomers broadly.

*Example I*

A dumbbell type of glass vessel having two compartments prepared from 15 mm. tubing, each approximately 5 inches long, connected with a capillary tube 3 mm. in diameter, was provided. A spherical glass bulb or break seal approximately 0.5 cm. in diameter, which could withstand evacuation but could be broken easily with a sharp instrument, was attached to one end. The break seal was encased in a 15 mm. tube which was connected to an 8 mm. tube. A side arm for introduction of graphite was attached to the side of the same compartment. An 8 mm. tube leading to a high vacuum system was connected to the opposite dumbbell compartment.

Two runs were made for the production of carbon-potassium catalysts. Materials charged to the reactor were as follows:

|  | Run | |
| --- | --- | --- |
|  | 1 | 2 |
| Graphite, grams | 5 | 5.2 |
| Potassium, grams | 2.6 | 2 |
| Graphite/K mole ratio | 6.3/1 | 8.5/1 |

In the first run, five grams of graphite was introduced through the side arm into the dumbbell compartment provided with the break seal. The side arm was then sealed. Potassium (2.6 grams), prepared in a special manner as hereinafter described, was introduced into the other dumbbell compartment.

Potassium was prepared in a manner such that it was protected from air oxidation. It was melted under a helium blanket and drawn into small bore glass tubes. The weight of potassium per unit length of tube could be calculated from the total weight. Short lengths of the tube containing potassium were charged to the dumbbell compartment until the desired amount had been introduced.

The glass vessel, containing graphite in one compartment and potassium in the other, was connected to a high vacuum system and, at the same time, the dumbbell compartment containing the graphite was heated to approximately 450° C. This operation was continued for 3 hours. This process expels oxygen and other volatile impurities from the system.

The tube leading to the high vacuum system was sealed and the glass vessel was placed in a vertical position with the potassium chamber at the top. The potassium chamber and capillary tube were heated at 450° C. for 16 hours during which time the potassium was melted and transferred to the graphite chamber. The capillary tube connector between the chambers was sealed and the chamber containing the reactants was then heated at 450° C. for 30 hours. The material had a coppery-red color characteristic of $C_8K$.

A funnel was attached to the 8 mm. tube next to the break seal and liquid petrolatum was introduced. The seal was broken to allow the liquid petrolatum to flow over the catalyst and form a protective coating. The protected catalyst composition was removed by breaking the tube. From the weight of the original catalyst (graphite and potassium charged) and the total weight of the composition containing the petrolatum, the concentration of active catalyst in petrolatum could be calculated. In this case it was 27.8 weight percent. The total composition was heated to melt the petrolatum and the mixture was stirred to insure a uniform dispersion of the graphite-potassium catalyst in the petrolatum.

The catalyst composition designated above as run 2, was prepared in a similar manner except that the system was evacuated 4 hours at 450° C. instead 3 hours. Transfer of potassium to the graphite chamber was effected at 400° C. over a 72-hour period. After sealing the capillary connector between the chambers, the mixture was heated 24 hours at 450° C. This catalyst composition was dispersed in petrolatum as hereinbefore described. The concentration was 30.5 weight percent.

A 16 weight percent dispersion of potassium in petrolatum was prepared. The petrolatum was charged to a creased flask provided with a high speed stirrer and heated until melted. Potassium was added and the mixture stirred to give a homogeneous composition. During the stirring operation the temperature was maintained just high enough to keep both the potassium and the petrolatum in the molten state.

The three catalysts were employed for the polymerization of isoprene using 7-ounce bottles as reactors. The catalyst for each run was weighed and pressed against the inside of the neck of the bottle. A 50/50 mixture by weight of isoprene in n-heptane, previously stored over anhydrous calcium sulfate for one week, was introduced, care being taken not to allow this material to come in contact with the catalyst. (The isoprene was distilled prior to being mixed with n-heptane.) The bottles were purged with prepurified nitrogen which expelled air from the reactors and removed moisture from monomer and diluent. The bottles were capped and agitated by rotation in a constant temperature bath (room temperature, 23–25° C.) for 16 hours.

The polymers were recovered by first adding a 5 weight percent solution of methanol in n-heptane to inactivate the catalyst and then adding sufficient methanol to coagulate the polymers. The polymers were dried under vacuum at 50° C. for about 24 hours.

The quantities of materials charged in each polymerization and the results obtained were as follows:

| | Polymerization Runs | | |
|---|---|---|---|
| | A | B | C |
| Isoprene, grams | 40 | 40 | 40 |
| n-Heptane, grams | 40 | 40 | 40 |
| Catalyst from run 1, grams [1] | 0.425 | | |
| Weight K in catalyst charged | 0.145 | | |
| Catalyst from run 2, grams [2] | | 0.424 | |
| Weight K in catalyst charged | | 0.118 | |
| Potassium catalyst [3] | | | 0.123 |
| Polymerization, temperature, C. | 23–25 | 23–25 | 23–25 |
| Time, hours | 16 | 16 | 16 |
| Conversion, percent | 90 | 90 | 95 |
| Inherent viscosity of polymer | 0.94 | 1.18 | 0.82 |
| Gel, percent | 0 | 0 | 0 |
| Infrared examination: | | | |
| 3,4 addition, percent | 60 | 63 | 47 |
| 1,2 addition, percent | 6 | 5 | 7 |
| Trans 1,4 addition, percent | 28 | 29 | 28 |

[1] Charged as 27.8 percent dispersion in petrolatum.
[2] Charged as 30.5 percent dispersion in petrolatum.
[3] Charged as 16 percent dispersion in petrolatum.

All the polymers were soft rubber.

Infrared examination of the polymers showed no evidence of cis 1,4 addition in products from runs A and B. There was a shift in the trans band in the polymer from run C which indicated the possibility of a significant amount of cis 1,4 addition polymer. The data show that a graphite-potassium catalyst increases the amount of 3,4 addition.

*Example II*

The procedure of Example I was employed for the production of a graphite-potassium catalyst. Five grams of graphite and 2.1 grams of potassium were charged (graphite/K mole ratio, 7.7/1). The system was evacuated for 3 hours at 400° C. after which the tube leading to the high vacuum system was sealed and the glass reactor was placed in a vertical position with the potassium chamber at the top. The potassium chamber and capillary tube were heated at 450° C. for 16 hours, the connector between the chambers was sealed, and the chamber containing the reactants was heated at 450° C. for 30 hours. The product was protected from oxidation with petrolatum as described in Example I.

The graphite-potassium catalyst was employed in four runs for the polymerization of isoprene using the procedure of Example I. After a 60-hour reaction period, benzene was added to each bottle until it was filled. Since the material in bottles B and D were very viscous, a portion of each was removed and more benzene was added. A small amount of the antioxidant, symmetrical di-beta-naphthyl-p-phenylenediamine, was added to each reaction mixture. Each mixture was centrifuged to remove the larger particles of carbon, and isopropyl alcohol was added to precipitate the polymer which was separated and dried in a vacuum oven at 50° C. for approximately 24 hours. The products were soft rubbers and were black on account of the small amount of carbon present.

The quantities of materials charged in each run and the results obtained were as follows:

| | Polymerization Runs | | | |
|---|---|---|---|---|
| | A | B | C | D |
| Isoprene | 40 | 40 | 40 | 40 |
| n-Heptane | 40 | 40 | 40 | 40 |
| Catalyst, grams [1] | 0.142 | 0.426 | 0.142 | 0.426 |
| Weight K in catalyst charged, grams | 0.042 | 0.126 | 0.042 | 0.126 |
| Polymerization temperature, C. | 30 | 30 | 50 | 50 |
| Time, Hours | 60 | 60 | 60 | 60 |
| Conversion, percent | 30 | 68 | 40 | (²) |

[1] Charged as 28.4 percent dispersion in petrolatum.
[2] Substantially complete conversion was obtained.

Samples of each of the polymers, which were soft rubbers, were blended and the blend was submitted for infrared examination. Results were as follows:

3,4 addition, percent _____ 66

1,2 addition, percent _____ 5
Trans 1,4 addition, percent _____ 31

Reference to Example I shows a control run using potassium alone as the catalyst.

The polymer blend was evaluated in the following gum stock recipe:

| | Parts by weight |
|---|---|
| Polymer blend | 100 |
| ZnO | 4 |
| Stearic acid | 4 |
| Sulfur | 4 |
| N-cyclohexyl-2-benzothiazylsulfenamide | 0.5 |
| Sym. di-beta-naphthyl-p-phenylenediamine | 1 |

The rubber was compounded on a roll mill and then cured at 307° F. One set of 3 samples was cured for 10 minutes and a second for 13 minutes. The following results, each of which represents an average of three runs, were obtained:

| | Cure at 307 F. | |
|---|---|---|
| | 10 Min. | 13 Min. |
| 300% modulus, p.s.i. | 153 | 213 |
| Tensile, p.s.i. | 527 | 473 |
| Elongation, percent | 707 | 527 |

*Example III*

The preparation of a carbon-potassium catalyst was effected in the manner described in Example I except that a high surface area furnace black (236 sq.m./gram) was used instead of graphite. Amounts of materials charged and operating conditions were as follows:

| | |
|---|---|
| Furnace black, grams | 3.2 |
| Potassium, grams | 1.3 |
| Carbon/K mole ratio | 8/1 |
| Evacuation of system | 20 hrs. at 450 C. |
| Transfer of K to carbon chamber | 8 hrs. at 450 C. |
| Reaction | 72 hrs. at 450 C. |
| Petrolatum dispersion, wt. percent | 22 |

Isoprene was polymerized at room temperature (23–25 C.) for a 16-hour period using the above-described catalyst. Eighty grams of a 50/50 weight mixture of isoprene in n-heptane and 0.330 gram of catalyst, in the form of a 22 percent dispersion in petrolatum, were charged. This amount of catalyst contained 0.091 gram of potassium.

The polymer was recovered by first adding a 5 percent solution of methanol in n-heptane to inactivate the catalyst and then adding more methanol to effect coagulation. The polymer was dried as in the preceding examples. A soft rubber containing some black was obtained.

*Example IV*

A glass vessel of the type employed in Example I was used in this example except that the two compartments were formed from 20 mm. tubing, each approximately 6 inches long, connected with a capillary tube 4 mm. in diameter. The spherical glass bulb or break seal was one cm. in diameter. Otherwise the arrangement was the same as already described. Amounts of materials charged and operating conditions were as follows:

| | |
|---|---|
| Graphite, grams | 13 |
| Potassium, grams | 3 |
| Graphite/K mole ratio | 14/1 |
| Evacuation of system | 6 hrs. at 350 C. |
| Transfer of K to graphite chamber | 16 hrs. at 350 C. |
| Reaction | 24 hrs. at 450 C. |

After potassium was transferred to the graphite chamber by heating the potassium chamber and graphite tube at 350 C. for 16 hours, the capillary tube was not sealed. The compartment containing the reactants was first heated 24 hours at 450 C. and then 16 hours at 500 C. to expel excess potassium. The connector between the chambers was then sealed and the reactants were heated an additional 60 hours at 500 C. to insure a homogeneous product. Petrolatum was added as in the foregoing examples to give a 28.2 weight percent dispersion of catalyst.

Isoprene was polymerized at 30 C. for a 16-hour period using the above-described catalyst. Eighty grams of a 50/50 weight mixture of isoprene in n-heptane and 0.730 gram of catalyst, in the form of a 28.2 percent dispersion in petrolatum, where charged.

The polymer was recovered by precipitation with isopropyl alcohol and dried in a vacuum oven at 50 C. The product was a soft rubber containing a small amount of carbon. It had a gel content of 5 percent and the inherent viscosity (determined on gel free portion) was 2.64. Infrared examination gave the following results:

| | |
|---|---|
| 3,4 addition, percent | 67 |
| 1,2 addition, percent | 4 |
| Trans 1,4 addition, percent | 35 |

*Example V*

A catalyst was prepared from super abrasion furnace black and sodium using the glass reaction vessel described in Example IV. Amounts of materials charged and operating conditions were as follows:

| | |
|---|---|
| Carbon black, grams | 13.0 |
| Sodium, grams | 3.1 |
| Carbon/sodium mole ratio | 8/1 |
| Evacuation of system | 20 hrs. at 250 C. |
| Transfer of Na to carbon chamber | 16 hrs. at 450 C. |
| Reaction | 72 hrs. at 450 C. |
| Petrolatum dispersion, wt. percent | 23.6 |

Two polymerization runs were made using different amounts of the carbon black-sodium catalyst. A control run was made using a 50 percent dispersion of sodium in xylene (obtained from National Distillers Corporation) as the catalyst. Polymerization was effected in the manner described in Example I. The polymers were recovered by precipitation with isopropyl alcohol and dried in a vacuum oven at 50 C.

The quantities of materials charged in each run and the results obtained were as follows:

| | Polymerization Runs | | |
|---|---|---|---|
| | A | B | C |
| Isoprene | 40 | 40 | 40 |
| n-heptane | 40 | 40 | 40 |
| Carbon black-Na catalyst, grams [1] | 0.378 | 0.604 | |
| Wt. Na in catalyst, grams | 0.073 | 0.116 | |
| Na catalyst, grams | | | 0.5 |
| Polymerization temperature, C | 30 | [2] 50 | [2] 50 |
| Time, hours | 16 | 48 | 48 |
| Inherent viscosity of polymer | [3] | 1.63 | 0.57 |
| Gel, percent | [3] | 0 | 0 |
| Infrared examination: | | | |
| 3,4 addition, percent | 71 | 74 | 56 |
| 1,2 addition, percent | 6 | 10 | 4 |
| Trans 1,4 addition, percent | 29 | 31 | 20 |

[1] Charged as 23.6 percent dispersion in petrolatum.
[2] Polymerization was effected at 50 C. for 48 hours and the bottles were then agitated at 30 C. for 72 hours.
[3] Values not determined.

Infrared examination of the polymers showed no evidence of cis 1,4 addition in products from runs A and B. There was evidence that the polymer from run C contained some cis 1,4 addition polymer.

*Example VI*

The graphite-potassium composition described in run 1 of Example I was employed in conjunction with titanium tetrachloride as a catalyst for the polymerization of isoprene. Variable quantities of the catalyst components were used in a series of runs. Comparative runs were made in which isoprene was polymerized using K–TiCl$_4$ systems and TiCl$_4$ alone. Isoprene was charged as a solution in n-heptane which contained equal parts by weight of monomer and solvent. Polymerizations were effected in 7-ounce bottles using the procedure described in Example I. The quantities of materials used in each run and the results obtained were as follows:

|  | Polymerization Runs | | | | | | | |
|---|---|---|---|---|---|---|---|---|
|  | 1 | 2 | 3 | 4 | 5 | 6 | 7 | 8 |
| Isoprene, grams | 40 | 40 | 40 | 40 | 40 | 40 | 40 | 40 |
| n-Heptane, grams | 40 | 40 | 40 | 40 | 40 | 40 | 40 | 40 |
| Catalyst Compositions: | | | | | | | | |
| (1) Graphite-K, grams [1] | | | | | | | | |
| Graphite-K, grams [1] | 1.00 | 0.43 | 1.00 | 2.00 | | | | |
| K in graphite-K charged, grams | 0.34 | 0.15 | 0.34 | 0.68 | | | | |
| K in graphite-K charged, millimoles | 8.70 | 3.84 | 8.70 | 17.39 | | | | |
| $TiCl_4$, grams [2] | 1.41 | 1.21 | 2.82 | 1.41 | | | | |
| $TiCl_4$, millimoles | 7.42 | 6.36 | 14.84 | 7.42 | | | | |
| Graphite-K/$TiCl_4$ millimole ratio | 1.2/1 | 1/1.66 | 1/1.81 | 2.34/1 | | | | |
| (2) K-$TiCl_4$: | | | | | | | | |
| K, grams [3] | | | | | 0.29 | 0.29 | 0.58 | |
| K, millimoles | | | | | 7.42 | 7.42 | 14.84 | |
| $TiCl_4$, grams [2] | | | | | 1.41 | 2.82 | 1.41 | |
| $TiCl_4$, millimoles | | | | | 7.42 | 14.84 | 7.42 | |
| K/$TiCl_4$ millimole ratio | | | | | 1/1 | 1/2 | 2/1 | |
| (3) $TiCl_4$, grams | | | | | | | | 2.82 |
| $TiCl_4$, millimoles | | | | | | | | 14.84 |
| Polymerization temperature, C | [4] 23–25 | [4] 23–25 | [4] 23–25 | [5] 50 | 50 | 50 | 50 | 50 |
| Polymerization time, hours | [4] 60 | [4] 60 | [4] 60 | [5] 72 | 90 | 90 | 90 | 90 |
| Inherent viscosity | 0.09 | 0.08 | 0.16 | 0.37 | [6] | [6] | [6] | 0.05 |
| Gel, percent | 0 | 0 | 16 | 18 | [6] | [6] | [6] | 0 |
| Solubility index | | | 9 | 34 | | | | |
| Unsaturation, percent | [6] | [6] | 55 | [6] | [6] | [6] | [6] | 58 |
| Infrared examination: | | | | | | | | |
| Trans 1,4 addition, percent | [7] | 6 | <3 | 20 | 18 | 22 | [7] | [7] |
| 3,4 addition, percent | <2 | 3 | <2 | 18 | 8 | 3 | 13 | 2 |

[1] Charged as 27.8 percent dispersion in petrolatum.
[2] Charged as a benzene solution containing 1.06 millimoles $TiCl_4$/ml. of solution.
[3] Charged as 16 percent dispersion in petrolatum as described in Example I.
[4] No polymer observed after 60 hours as evidenced by no apparent change in viscosity of the mixtures. Temperature was elevated to 50 C. for 72 hours during which time polymerization occurred.
[5] Bottle placed in 50 C. bath for 72 hours and then transferred to 30 C. bath for another 72 hours.
[6] Not determined.
[7] Contained isopropyl alcohol which prevented measurement.

The polymers from this series of runs were coagulated by addition of isopropyl alcohol. They were washed with isopropyl alcohol, dried in a vacuum oven at 50 C. for 24 hours, dissolved in benzene, and passed through a pressure filter to remove catalyst particles. The polymers were finally recovered by reprecipitation with isopropyl alcohol and drying as before.

The products were all resinous materials which were readily soluble in benzene. They were white to yellow powders when dry.

The infrared examination revealed no significant amounts of 1,2 addition in any of the samples. There is some indication that the product from run 8 may contain a substantial quantity of cis polymer. Most of the samples appear to be considerably less than 100 percent unsaturated. This is indicative of cyclization. The unsaturation has been determined on products from runs 3 and 8. All of the samples except No. 8 have a band which his not been observed previously with polyisoprene. This band might be connected with cyclization.

I claim:

1. In the catalytic polymerization of conjugated dienes of 4 to 12 carbon atoms under polymerizing conditions, the improvement comprising carrying out said polymerization in the presence of the reaction product of carbon having a lamellar structure and an alkali metal selected from the group consisting of sodium, potassium, rubidium, and cesium as catalyst component.

2. The improvement of claim 2 wherein the polymerization is carried out at a temperature in the range —20 to 150° C. and in the presence of a hydrocarbon which is liquid under the polymerizing conditions.

3. A polymerization process for producing polymers of conjugated dienes which comprises polymerizing a conjugated diene of 4 to 8 carbon atoms in the presence of a catalyst comprising the reaction product of carbon having a lamellar structure and an alkali metal selected from the group consisting of sodium, potassium, rubidium and cesium, said reaction product containing 8 to 32 mols of carbon per mol of alkali metal, said polymerization being carried out at a temperature in the range —20 to 150° C.

4. The process of claim 3 wherein the polymerization is carried out in the presence of a liquid hydrocarbon diluent and the catalyst employed is in the range 0.01 to 15 weight percent based on weight of monomer.

5. A polymerization process comprising polymerizing monomers comprising at least 50 weight percent of a conjugated diene of 4 to 12 carbon atoms and the remainder being a copolymerizable monomer having an active $CH_2=C=$ group in the presence of a catalyst comprising (A) 0 to 10 mols of a compound of the formula $X_nM(OR)_m$ where X is a halogen, M is a group IV metal, R is a radical selected from the group consisting of alkyl, aryl, cycloalkyl, alkaryl, aralkyl, alkenyl, cycloalkenyl, and acyl, $m$ and $n$ are integers of from 0 to 4 and $n+m$ is equal to the valence of M per mol of (B) the reaction product of carbon having a lamellar structure and an alkali metal selected from the group consisting of sodium, potassium, rubidium, and cesium, said reaction product comprising 8 to 32 mols of carbon per mol of alkali metal.

6. The process of claim 5 wherein the catalyst is employed in the range 0.01 to 15 weight percent based on total monomers and said polymerization is carried out at a temperature in the range —20 to 150° C. and in the presence of a liquid hydrocarbon diluent, said hydrocarbon diluent containing a maximum of 10 carbon atoms per molecule.

7. The process of claim 6 wherein the monomer comprises at least 70 weight percent conjugated diene, the conjugated diene contains 4 to 8 carbon atoms per molecule and the reaction is carried out at a temperature in the range —5 to 80° C.

8. The process of claim 7 wherein the carbon of said reaction product is graphite.

9. The process of claim 8 wherein the monomer being polymerized is isoprene.

10. The process of claim 8 wherein the monomer being polymerized is butadiene.

11. The process of claim 8 wherein the monomer being polymerized is piperylene.

12. The process of claim 7 wherein the carbon of said reaction product is furnace black.

13. The process of claim 12 wherein the monomer being polymerized is isoprene.

14. The process of claim 12 wherein the monomer being polymerized is butadiene.

15. The process of claim 12 wherein the monomer being polymerized is piperylene.

References Cited in the file of this patent

UNITED STATES PATENTS 2,919,266 Lauer _____ Dec. 29, 1959